United States Patent
Graj et al.

[11] Patent Number: 5,802,960
[45] Date of Patent: Sep. 8, 1998

[54] ERGONOMIC COOKWARE

[75] Inventors: Raymond Graj, New York; Simon Graj, Pleasantville; Eric Gustavsen, New York, all of N.Y.

[73] Assignee: Graj & Gustavsen, New York, N.Y.

[21] Appl. No.: 980,037

[22] Filed: Nov. 26, 1997

[51] Int. Cl.[6] .............. A47J 27/00; A47J 37/00; A47J 45/06; A47B 95/02

[52] U.S. Cl. .............. 99/403; 16/110 R; 16/110.5; 16/114 A; 16/110 A; 99/337; 99/422; 294/57; 126/373; 126/390

[58] Field of Search .............. 99/337, 338, 403, 99/410, 422, 425, 646 R; 43/23, 25; 16/110 R, 110.5, 111 R, 114 A, 114 R, 110 A, DIG. 12; 126/390, 369, 373; 220/316, 735, 755, 752, 759, 912; 294/57, 58, 19.1, 1.1, 25; D7/357, 361, 395

[56] References Cited

U.S. PATENT DOCUMENTS

| | | | |
|---|---|---|---|
| 4,014,129 | 3/1977 | Capra | 43/23 |
| 4,462,388 | 7/1984 | Bohl et al. | 126/390 |
| 4,574,777 | 3/1986 | Bohl et al. | 99/425 X |
| 4,653,468 | 3/1987 | Lemme et al. | 126/373 |
| 4,711,366 | 12/1987 | Chen | 99/337 X |
| 4,822,087 | 4/1989 | DeCarlo | 294/58 |
| 4,926,521 | 5/1990 | Gagnepain | 16/110 A |
| 5,125,130 | 6/1992 | Stanish | 16/110 R |
| 5,313,735 | 5/1994 | Latouche | 43/25 |
| 5,365,832 | 11/1994 | Gaydoul | 99/422 |
| 5,373,608 | 12/1994 | Welch | 99/403 X |
| 5,666,874 | 9/1997 | Wang | 99/348 |
| 5,715,570 | 2/1998 | Hyun | 16/110 A |

*Primary Examiner*—Timothy F. Simone
*Attorney, Agent, or Firm*—Amster, Rothstein & Ebenstein

[57] ABSTRACT

The present invention relates to heat resistant ergonomic cookware that incorporates a handle which utilizes a lever principal to distribute the weight from the cookware to the underside of the forearm, is equipped with an upright handle grip, and is angled so as to facilitate an increase range of pouring motion.

28 Claims, 5 Drawing Sheets

ERGONOMIC COOKWARE

BACKGROUND OF THE INVENTION

The present invention relates generally to cookware handles, and more particularly, an improved ergonomic cookware that: redistributes the weight of a cooking utensil from the wrist and forearm muscles to the muscles in the upper arms and shoulders, incorporates an upright grip permitting a natural hand wrist position, facilitates an increased range of pouring motion, and provides superior aesthetics.

For many people it is difficult to lift or manipulate cookware, particularly when the cookware is being used for its intended purpose, i.e., preparation of foods and/or liquids for consummation by means of heat. Furthermore, many people have difficulty tilting cookware to facilitate the draining of excess liquids and/or the removal of cooked foods. The difficulties that many individuals experience in cooking with relatively heavy cookware can result from a variety of physical conditions, including, among other things, arthritis in the wrists and infirm forearm muscles. As such, there is a long recognized need to facilitate the lifting of cookware. The improved ergonomic cookware claimed and described in the present invention addresses and fulfills this need.

Besides providing an ergonomic handle that shifts the weight of a cooking utensil from the wrist and forearm muscle to the muscles in the upper arm and shoulder, it is important that the handle be angled relative to the cookware so as to facilitate a wide range of pouring motion. It is also important that the handle be shaped and angled so as to permit a stabilized lifting and tilting of the cookware. Furthermore, it is important that the handle be heat resistant and that the exposure of the hand and forearm to a heat source be minimized. In addition, it is important that the structure of the handle be aesthetically pleasing and enhance, or at least not detract, from the appearance of the handle when affixed to or integrated with the cookware.

Besides the standard plastic molded heat-resistant handle, there are many more complex cookware handles known in the prior art. However, none of the structures in the prior art teach or suggest the present invention. For instance, U.S. Pat. No. 5,313,735 to Latouche discloses a rotatable handle extension for attaching to fishing rods and the like, including cooking pans. While the handle described in Latouche is contoured in an effort to shift the weight of an object attached to the handle from the wrist and forearm muscles to the muscles in the upper arm and shoulder, it does not achieve the advantages provided by the present invention. For example, because the handle structure disclosed in Latouche is neither angled substantially between 10 and 25 degrees nor shaped to inhibit sideways motion of the forearm relative to the hand when using the handle to rotate/tilt a heavy load as is the present invention, the handle disclosed in the Latouche patent cannot experience the wide range of pouring motion available in the present invention while providing stable support throughout the tilting/pouring motion. In fact, because Latouche is primarily directed to counterbalancing the strain to the wrist caused by one dimensional forces, e.g., catching fish, the structure fails to address the need to provide a stabilizing structure for the multidimensional forces asserted on the wrist and forearm muscles during the process of lifting and tilting the cookware.

Similarity, U.S. Pat. No. 4,822,087 to DeCarlo, which shows a device intended to improve the lifting characteristics of tools such as shovels, and the like, does not contemplate the need to provide a stabilizing structure for the multidimensional forces on the wrist and forearm muscles during the process of lifting and tilting cookware. Furthermore, unlike the present invention, the small forearm support disclosed in DeCarlo is not ergonomically contoured sufficiently to inhibit sideways motion of the forearm relative to the hand.

U.S. Pat. No. 4,014,129 to Capra shows a fishing rod handle attachment that is intended to distribute forces to the forearm along the length of the handle. As with Latouche, Capra is primarily directed to counterbalancing the strain to the wrist caused by one dimensional forces and does not address the multidimensional forces asserted on the wrist and forearm muscles during the process of lifting and tilting the cookware. Furthermore, Capra fails to show an upright gripping handle for the gripping hand. This forces the users of the Capra device to hold their hand and wrist at an unnatural angle causing strain to the wrist due to over-articulation of the wrist.

SUMMARY OF THE INVENTION

In view of the prior art, it is an object of the present invention to provide an improved ergonomic cookware handle which utilizes a lever principal to transfer the weight of the cookware from the wrist and forearm muscles to the muscles of the upper arm and shoulder.

It is a further object of the present invention to provide an improved cookware handle which is shaped and angled so as to permit a stabilized lifting and tilting of the cookware.

It is a further object of the present invention to provide an ergonomic handle design that is contoured to the natural shape of the arm, from the heel of the hand, along the inner wrist and up the forearm.

It is a further object of the present invention to provide an upright grip that permits a more natural and stable wrist hand position.

It is still a further object of the present invention to provide an ergonomic handle design which has superior aesthetics which enhance and do not detract from the appearance of the handle.

In accordance with the above objects and additional objects that will become apparent hereinafter, the present invention relates to a heat resistant ergonomic cookware that utilizes a lever principal to distribute the weight from the cookware to the underside of the forearm, is equipped with an upright handle with an upright grip, and is angled so as to facilitate an ideal range of pouring motion.

DETAILED DESCRIPTION

Figure 1:
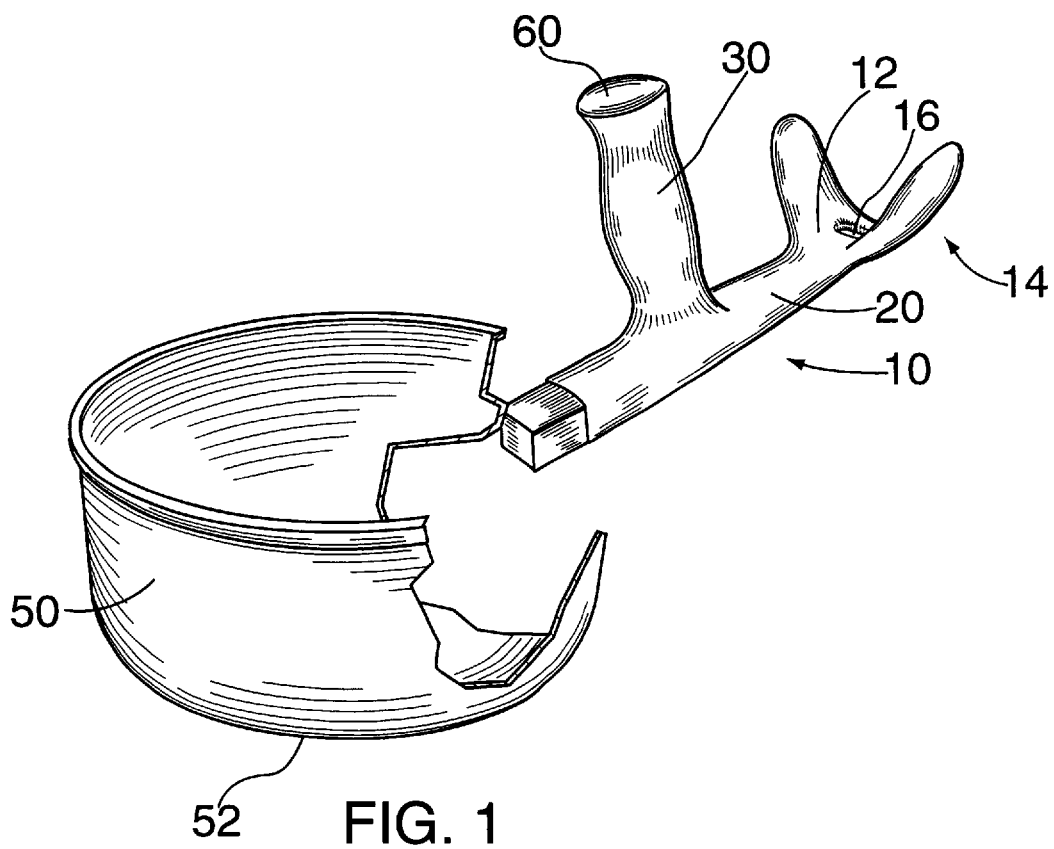
FIG. 1 is a perspective view of an improved ergonomic cookware in accordance with the preferred embodiment of the present invention.

Referring now to the drawings, wherein like numbers refer to like parts in each view, an embodiment to be preferred of an improved ergonomic handle as attached to a cookware utensil is disclosed in FIGS. 1 through 6b.

Referring now to FIG. 1, the improved ergonomic handle 10 is attached to the cookware utensil 50. Although, the present invention contemplates use as a clamp-on improved ergonomic handle that could be attached to an existing handle, it is preferred that the improved ergonomic handle 10 be integrally attached to the cooking utensil 50. This is because a clamp-on handle (1) might not be safe when dealing with hot foods and (2) could turn or shift when in use, particularly when in use, with heavy pots or pans. Preferably, the handle 10 is affixed to the cooking utensil 50 by the safest and most secure industry methods.

The shape and size of the cookware utensil 50 is not critical since the present invention is intended to be used with a variety of cookware shapes and sizes. However, the present invention is ideally used with heavy pots and pans. Furthermore, the improved ergonomic handle 10 is preferably a one-piece molded plastic handle and manufactured using existing methods of heat-resistant plastic molding.

Figure 2:
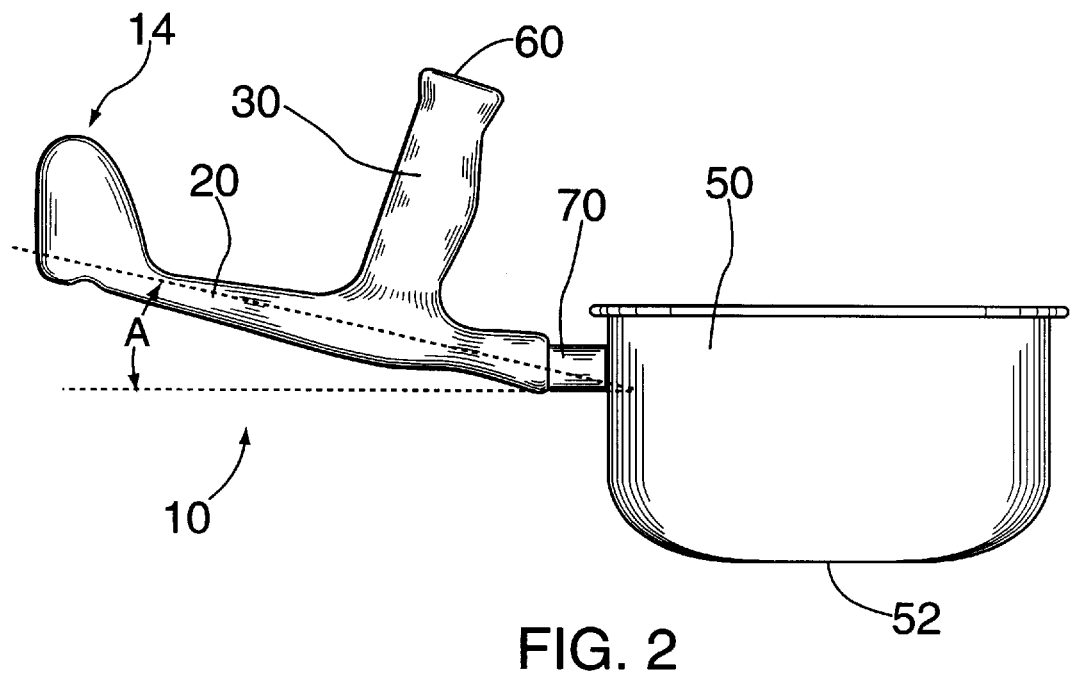
FIG. 2 is a side view of an improved ergonomic cookware showing an angle A between the handle and a horizontal plane parallel with the base of the cookware in accordance with the preferred embodiment of the present invention.
Figure 3:
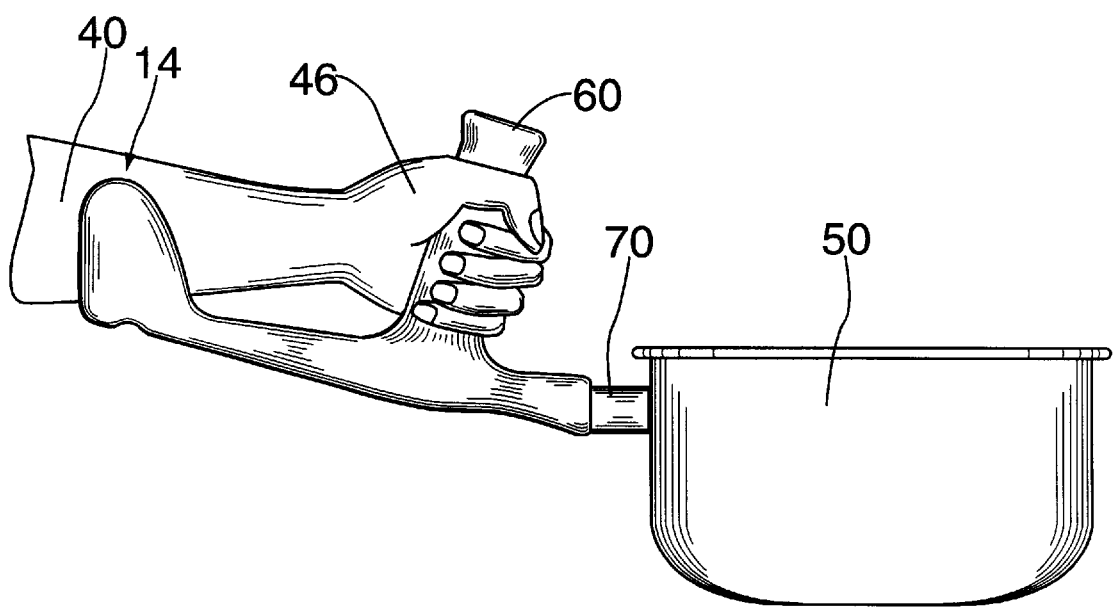
FIG. 3 is a side view of an improved ergonomic cookware in a usage situation in accordance with the preferred embodiment of the present invention.

As shown in FIG. 2, the improved ergonomic handle 10 consists of a base portion 70, an elongated body portion 20, and a hand grip 30. The elongated body portion 20 is integrally attached to the hand grip 30 such that the hand grip 30 extends substantially perpendicular to the upwardly directed concaved surface 12 of the body portion 20. As shown in FIG. 3, the hand grip 30 is located on said body portion so as to permit a more natural hand wrist position. In a preferred embodiment, the hand grip 30 is contoured so as to engage a substantial portion of a gripping hand 46, thus reducing the likelihood of the gripping hand 46 slipping up over the hand grip 30. Furthermore, the top of the hand grip 30 is preferably flared-out so as to also reduce the likelihood of the gripping hand 46 slipping up over the hand grip 30. The flared-out portion of the hand grip is shown as a knob 60.

Figure 4:
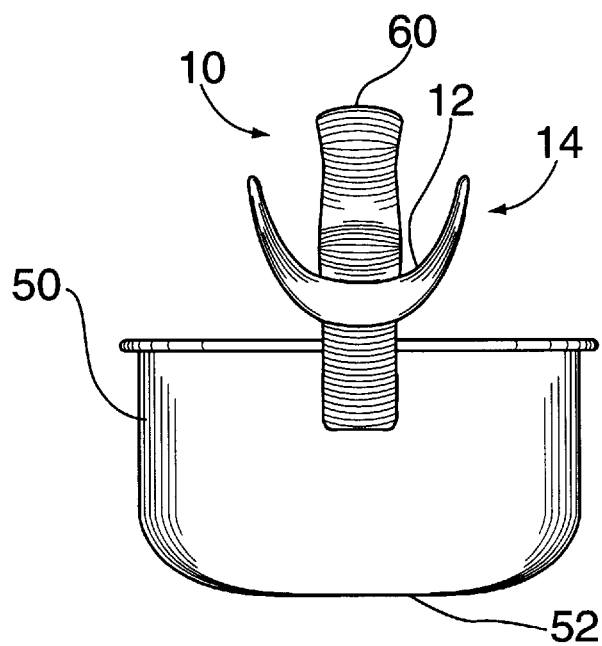
FIG. 4 is a front view of an improved ergonomic cookware in accordance with the preferred embodiment of the present invention.
Figure 5:
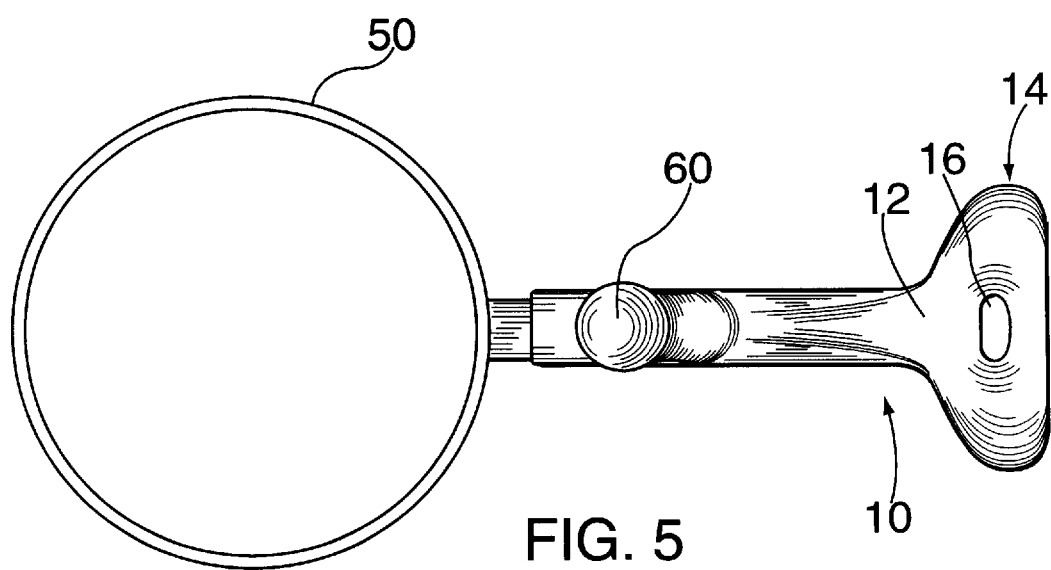
FIG. 5 is a top plan view of an improved ergonomic cookware in accordance with the preferred embodiment of the present invention.
Figure 6A:
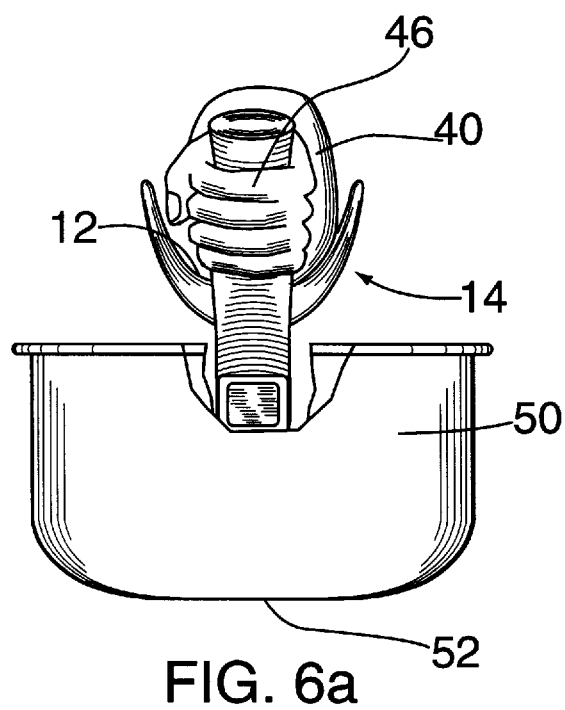
FIG. 6a is a rear view of an improved ergonomic cookware in a tilted usage state in accordance with the preferred embodiment of the present invention.

Referring to FIGS. 4 and 6a, the upwardly directed concaved surface 12 of the butt end 14 of the handle 10 is shaped to engage a substantial length of the under and adjacent side portions of the forearm 40 so as to inhibit sideways motion of the hand 46 relative to the forearm 40. In particular, the butt end 14 of the handle 10 is preferably molded in a substantially hollow truncated ellipsoid form. Referring to FIG. 5, the upwardly directed concaved surface 12 is preferably provided with an aperture 16 extending through the butt end 14 of the handle 10 so as to facilitate storing the improved ergonomic handle 10 and cooking utensil 50. The upwardly directed concaved surface 12 of the butt end 14 preferably engages between 1 and 8 inches of the under and adjacent side portions of the forearm 40. In addition, the upwardly directed concaved surface 12 is preferably contoured to mainly accommodate the natural taper of the forearm 40 and the hand 46.

Figure 6B:
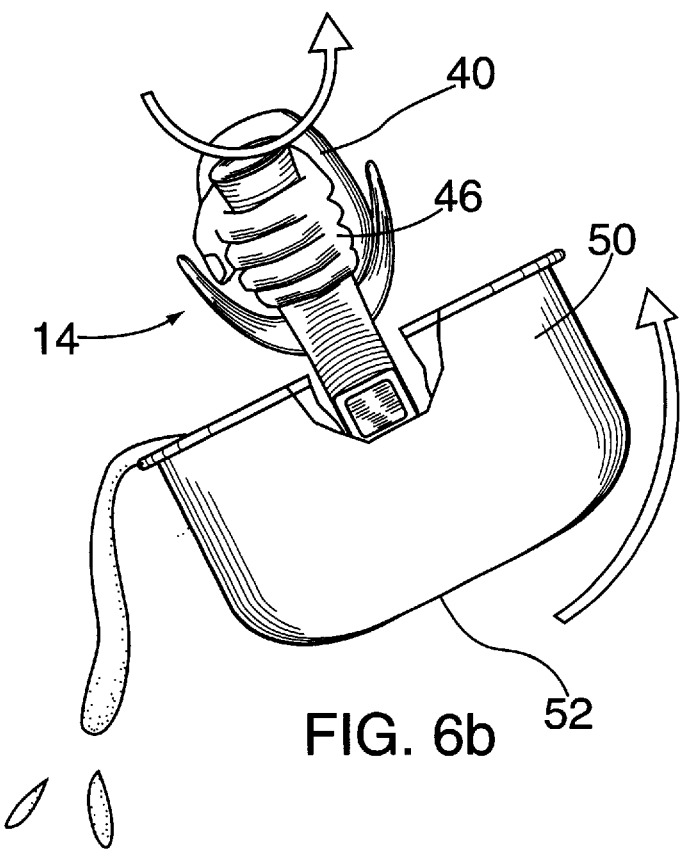
FIG. 6b is a rear view of an improved ergonomic cookware in a tilted usage state in accordance with the preferred embodiment of the present invention.

Referring now to FIG. 2, the improved ergonomic handle 10 as shown and described above is attached to the cookware utensil 50 at an angle A from a horizontal plane parallel to the base 52 of the cooking utensil 50 so as to facilitate stabilized lifting, tilting and carrying of the cooking utensil 50. The angle A is preferable substantially between 10 and 25 degrees. This range of angles permits an ideal pouring motion by creating a stable wrist arc from start to finish. As shown in FIG. 6b, the present invention permits the stabilized tilting of the cookware utensil 50 while redistributing the multidimensional forces normally asserted on the wrist and forearm to the upper arm and shoulder. In the preferred embodiment, angle A is 15 degrees.

In a preferred embodiment of the present invention, it is envisioned that the section of the elongated body portion 20 between the hand grip 30 and the butt end 14 of the handle 10 is molded so as to permit gripping by the hand, thus, facilitating the lifting of the handle 10 (and attached cookware, particular when empty) without necessitating the hand 46 to grip the hand grip 30.

Figure 7:
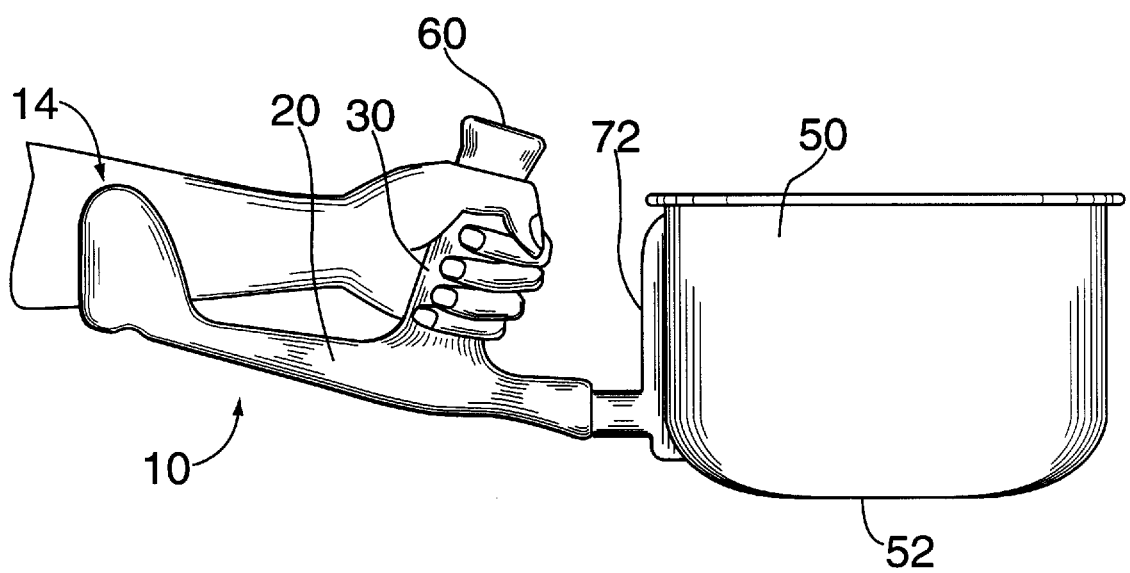
FIG. 7 is a side view of an improved ergonomic cookware in accordance with an alternative embodiment of the present invention.

In an alternative preferred embodiment as shown in FIG. 7, it is envisioned that the base portion 72 of the ergonomic handle 10 is positioned relative to the hand grip 30 so as to shield the back of the fingers of the hand 46 from heat disseminating from the cooking utensil 50. In this alternative preferred embodiment the base portion 70 is positioned adjacent to the hand grip 30 wherein enough space exists between the hand grip 30 and base portion 70 so as to permit the users hand to grip the hand grip 30.

In addition to utilizing the improved ergonomic handle with cookware, i.e., pots, pans, skillets, frying pans, and saucepans, it is envisioned that the improved ergonomic handle can be used with buckets, watering cans, casserole dishes, coffee pots, colanders, containers for household or kitchen use, containers for food, jugs, pails, serving plates and tea pots. It is also envisioned that the handle can be used with hand and garden tools such as shovels, spades, backhoes, rakes and other tools which result in multidimensional forces on the forearm and wrist.

While the invention has been described in detail herein in accordance with certain preferred embodiments thereof, many modifications and changes therein may be effected by those skilled in the art. Accordingly, it is intended by the appended to cover all such modifications and changes as fall within the true spirit and scope of the invention.

What is claimed is:

1. An ergonomic handle attached to a cooking utensil at an upward angle substantially between 10 and 25 degrees from a horizontal plane that is parallel to the base of said cooking utensil for stabilized lifting, carrying and tilting of said cooking utensil, said handle comprising:

an elongated body portion having an upwardly directed concaved surface for forearm support sized to engage a substantial portion of the forearm in an amount sufficient to inhibit sideways motions of said forearm relative to the gripping hand;

said body portion having integrally attached a handle gripping means extending substantially perpendicular to said upwardly directed concaved surface of said body portion wherein said handle gripping means is positioned on said body portion so as to receive said gripping hand of said forearm such that the wrist is in a unrotated state.

2. The ergonomic handle as defined in claim 1 wherein said handle is heat-resistant molded plastic.

3. The ergonomic handle as defined in claim 1 wherein said handle gripping means is sized to engage a substantial portion of said gripping hand.

4. The ergonomic handle as defined in claim 1 wherein said handle gripping means radiates outwardly at the top end.

5. The ergonomic handle as defined in claim 3 wherein said handle gripping means radiates outwardly at the top end.

6. The ergonomic handle as defined in claim 1 wherein said handle is permanently attached to said cooking utensil.

7. The ergonomic handle as defined in claim 1 wherein said upwardly of said elongated body portion engages between about 1 and 8 inches of the under and adjacent side portions of said forearm.

8. The ergonomic handle as defined in claim 1 wherein said upwardly directed concaved surface is tapered from an elongated broadened width near the butt end of said elongated body portion toward a substantially narrower width near the forward end of said elongated body portion so as to accommodate the natural taper of said forearm and heel of said gripping hand.

9. The ergonomic handle as defined in claim 8 wherein said upwardly directed concaved surface of said elongated body portion engages between about 1 and 8 inches of the under and adjacent side portions of said forearm.

10. The ergonomic handle as defined in claim 1 wherein said butt end of said body portion is molded in a substantially hollow truncated ellipsoid form.

11. The ergonomic handle as defined in claim 8 wherein said butt end of said body portion is molded in a substantially hollow truncated ellipsoid form.

12. The ergonomic handle as defined in claim 1 further comprising a base portion that attaches said handle to said cooking utensil wherein said base portion is position adjacent to said handle gripping means such that sufficient space exists between said handle gripping means and base portion so as to permit said gripping hand to grip said handle gripping means.

13. The ergonomic handle as defined in claim 1 wherein the butt end of said elongated body portion has an aperture for facilitating storing said ergonomic handle.

14. The ergonomic handle as defined in claim 1 wherein the section of said elongated body portion between said hand grip and the butt end of said elongated body portion is shaped so as to permit said section of said elongated body portion to be gripped and lifted by hand.

15. An ergonomic cooking utensil comprising:

a cooking utensil for the preparation and cooking of foods and liquids; and an ergonomic handle attached to said cooking utensil at an upward angle substantially between 10 and 25 degrees from a horizontal plane that is parallel to the base of said cooking utensil for stabilized lifting, carrying and tilting of said cooking utensil, said ergonomic handle having an elongated body portion with an upwardly directed concaved surface for forearm support sized to engage a substantial portion of the forearm in an amount sufficient to inhibit sideways motion of said forearm relative to the gripping hand;

said body portion having integrally attached a handle gripping means extending substantially perpendicular to said upwardly directed concaved surface of said body portion wherein said handle gripping means is positioned on said body portion so as to receive said gripping hand of said forearm such that the wrist is in an unrotated state.

16. The ergonomic cooking utensil as defined in claim 15 wherein said ergonomic handle is heat-resistant molded plastic.

17. The ergonomic cooking utensil as defined in claim 15 wherein said handle gripping means is sized to engage a substantial portion of said gripping hand.

18. The ergonomic cooking utensil as defined in claim 15 wherein said handle gripping means radiates outwardly at the top end.

19. The ergonomic cooking utensil as defined in claim 17 wherein said handle gripping means radiates outwardly at the top end.

20. The ergonomic cooking utensil defined in claim 15 wherein said ergonomic handle is permanently attached to said cooking utensil.

21. The ergonomic cooking utensil as defined in claim 15 wherein said upwardly directed concaved surface of said elongated body portion engages between 1 and 8 inches of the under and adjacent side portions of said forearm.

22. The ergonomic cooking utensil as defined in claim 15 wherein said upwardly directed concaved surface is tapered from an elongated broadened width near the butt end of said elongated body portion toward a substantially narrower width near the forward end of said elongated body portion so as to mainly accommodate the natural taper of said forearm and heel of said gripping hand.

23. The ergonomic cooking utensil as defined in claim 22 wherein said upwardly directed concaved surface of said elongated body portion engages between 1 and 8 inches of the under and adjacent side portions of said.

24. The ergonomic cooking utensil as defined in claim 22 wherein said butt end of said body portion is molded in a substantially hollow truncated ellipsoid form.

25. The ergonomic cooking utensil as defined in claim 15 wherein said butt end of said body portion is molded in a substantially hollow truncated ellipsoid form.

26. The ergonomic cooking utensil as defined in claim 15 further comprising a base portion that attaches said handle to said cooking utensil wherein said base portion is position adjacent to said handle gripping means such that sufficient space exists between said handle gripping means and base portion so as to permit said gripping hand to grip said handle gripping means.

27. The ergonomic cooking utensil as defined in claim 15 wherein the butt end of said elongated body portion has an aperture for facilitating storing said ergonomic handle.

28. The ergonomic cooking utensil as defined in claim 15 wherein the section of said elongated body portion between said hand grip and the butt end of said elongated body portion is shaped so as to permit said section of said elongated body portion to be gripped and lifted by hand.

* * * * *